June 24, 1952  V. NIEWINSKI  2,601,552
PIVOTED TARGET DEVICE
Filed July 21, 1949  2 SHEETS—SHEET 1
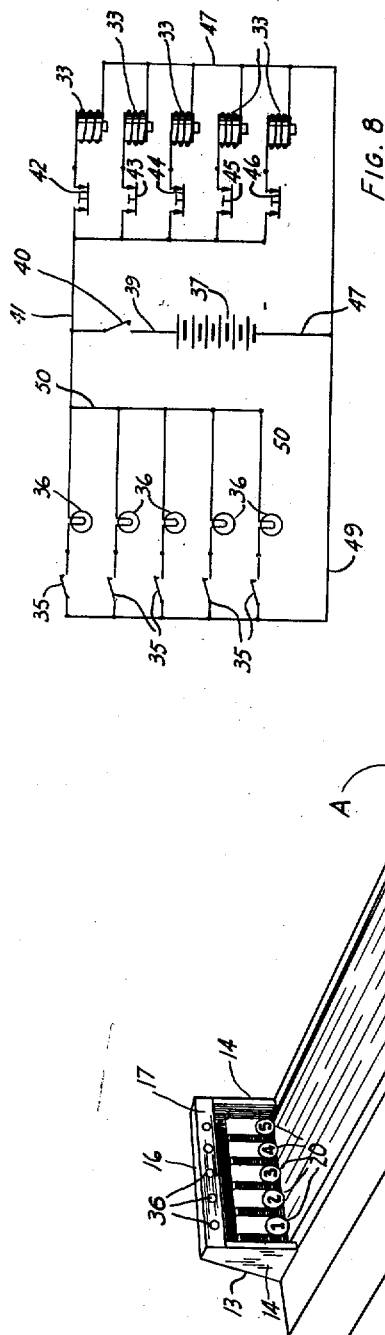
Inventor
VICTOR NIEWINSKI
By Robert M. Dunning
ATTORNEY June 24, 1952
V. NIEWINSKI
2,601,552
PIVOTED TARGET DEVICE
Filed July 21, 1949
2 SHEETS—SHEET 2
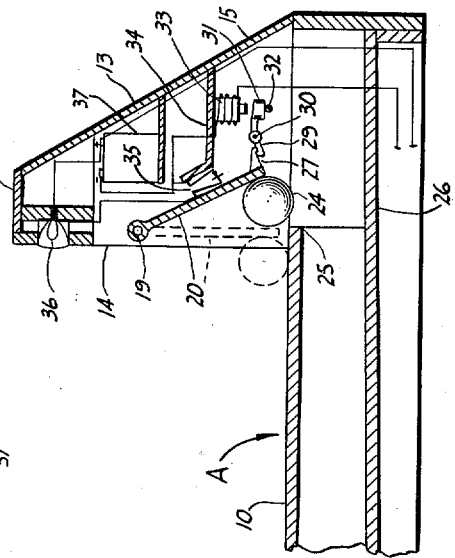
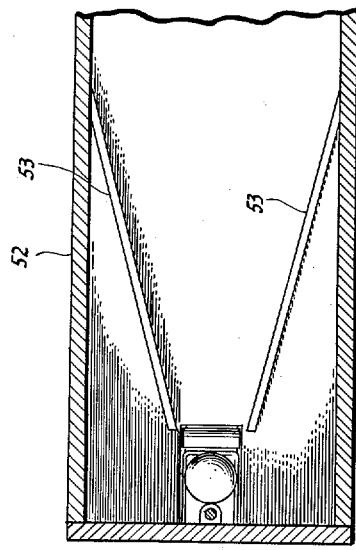
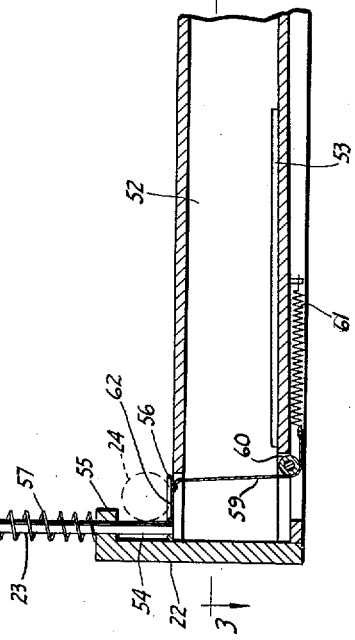
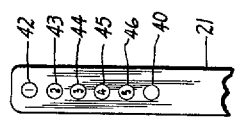
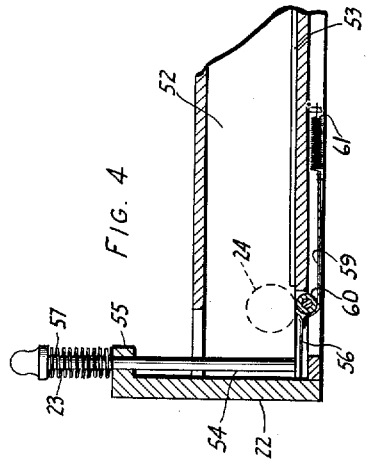
Inventor
VICTOR NIEWINSKI
By Robert M. Dunning
ATTORNEY Patented June 24, 1952

2,601,552

UNITED STATES PATENT OFFICE 2,601,552

PIVOTED TARGET DEVICE

Victor Niewinski, St. Paul, Minn.

Application July 21, 1949, Serial No. 105,955

2 Claims. (Cl. 273—127)

My invention relates to an improvement in games and deals particularly with a game in which balls are propelled along a flat surface by a suitable propelling paddle.

An object of the present invention lies in the provision of a game having some similarity to bowling, shuffle board, and other games. At the same time, however, my game employs a different construction and method of operation and has been found extremely attractive from both a player's standpoint and a spectator's standpoint. In playing the game balls are propelled along a table by means of a paddle toward a series of pivotally supported targets. These targets are so arranged that they may be swung rearwardly by the force of the ball and remain in tilted position until reset by the player. As a result the score of the game may be readily determined.

A feature of the present invention lies in the provision of a series of pivotally supported targets equipped with individual latch means for holding a tilted target in tilted position. An indicator circuit is provided for producing a signal to indicate which target has been tilted. Similarly the latch holding the target is magnetically controlled so that it may be disengaged by depressing a predetermined button so that the score of the game may be readily calculated.

A feature of the present invention lies in the provision of a game in which balls are propelled along an alley for a desired distance toward pivoted targets. The ball is automatically returned after pivoting a target by means of a suitable ball return. This ball return delivers the balls to the end of the playing surface in which the player is located and below the level of the playing surface. By merely elevating the ball by a suitable elevating means, the ball is in position to be replayed.

Another feature of the present invention lies in the specific apparatus for lifting the balls singly and in succession. While only one ball is used at a time a series of balls may be employed in the game in order to speed up the play. Means are provided for elevating the balls one at a time in succession.

An added feature of the present invention lies in the provision of a novel type of playing element for propelling the ball. This element comprises a handle usually somewhat similar in length to a golf club but having a flattened ball propelling surface by means of which the ball may be engaged.

These and other objects and novel features of my invention will be more clearly and fully set forth in the following specification and claims.

In the drawings forming a part of my specification:

Figure 1 is a perspective view of my game showing the general arrangement of the parts thereof.

Figure 2 is a longitudinal sectional view through the game showing the arrangement of parts.

Figure 3 is a sectional view of a portion of the ball return device the position of the section being indicated by the line 3—3 of Figure 2.

Figure 4 is a sectional view similar to a portion of Figure 2 showing the ball return device in a different position.

Figure 5 is an elevation view of the control post supporting the push buttons and releasing targets.

Figure 6 is a plan view of the ball propelling device.

Figure 7 is a sectional view through the operating end of the ball propelling device.

Figure 8 is a wiring diagram of the electrical circuits.

The general assembly of the game A is best illustrated in Figure 1 of the drawings. In this view I show an elongated alley or playing surface 10 having raised side rails 11 and 12. These raised side rails are designed to prevent the ball from rolling from the alley when propelled and may function as a banking board for deflecting the ball if desired.

At one end of the alley 10 I provide an upwardly projecting enclosure 13 which includes a pair of side panels 14, an inclined back panel 15 and a relatively short top panel 16. An indicator display panel 17 projects downwardly from the forward edge of the top panel between the side panels 14 as will be later described.

A transverse shaft 19 is supported by the side panels 14 and acts to support a series of spaced pivotal targets 20. The targets 20 normally are suspended on a substantially vertical plane as indicated in Figure 1 of the drawings and as indicated in dotted outline in Figure 2 of the drawings. The alley 10 terminates closely adjacent to the targets 20 so that after the targets have been pivoted by the ball, the ball may drop downwardly as will be later described.

The opposite end of the alley 10 is provided with a control post 21 for actuating the target release mechanism in a manner which will be later described. The end 22 of the alley 10 also includes ball elevating mechanism which is indicated in general by the numeral 23.

The targets 20 are pivoted when struck by a ball 24 rolled over the playing surface 10. As the ball 24 strikes each individual target 20 the target is pivoted about the shaft 19 in a rearward direction, the pivotal movement being sufficient so that the ball 24 may drop from the end 25 of the playing surface 10 and onto the ball return incline 26. A catch 27 is mounted at the lower edge of each target 20 on the rear surface thereof. This catch 27 is automatically engageable with a latch lever 29 pivotally supported on a transverse shaft 30.

The latch lever 29 is provided with a weighted end 31 which normally rests upon a transversely extending cushion bar or stop 32. A magnet 33 is supported upon a shelf 34 above the weighted end 31. The latch lever 29 and catch 27 are so constructed that as the target 20 is pivoted in a counter-clockwise direction as viewed in Figure 2, the catch will engage the hook end of the latch lever 29, pivoting the latch lever sufficiently to engage therewith. The catch 27 remains engaged in the latch 29 until the magnet 33 is actuated, whereupon the target 20 will swing into vertical position.

Suitable switch contacts 35 are provided rearwardly of each of the targets 20 and which are urged together when the target 20 is in the inclined position shown in Figure 2 of the drawings. The switch contacts 35 control a circuit to a suitable indicating light such as 36 which may be located above the respective target. As a result when any target 20 is pivoted as shown in full lines in Figure 2 an indicating light such as 36 will be illuminated above that particular target.

The circuit for controlling the target magnets and indicators is best shown in Figure 8 of the drawings. A source of power supply 37 which may be a battery or suitable line current is connected by a conductor 39 through the main switch 30 to a conductor 41, connected to a series of push buttons 42, 43, 44, 45 and 46. The other terminal of the push buttons described is connected to a corresponding magnet 33. The other terminal of the magnets is connected by a conductor 47 to the other terminal of the current supply source 37. Thus as each of the push buttons 43 through 46 is individually operated a circuit is closed to a corresponding magnet 33 which releases a corresponding target 20. The targets and magnets have been given similar identifying numerals as they all occur in parallel and in a similar manner.

The current supply source 37 is likewise connected by a conductor 49 to a series of contact switches 35 arranged in parallel. The other terminal of each contact switch 35 is connected to a corresponding indicator light 36. The contact switches 35 each are actuated by an individual target 20 and each close a separate circuit to a corresponding indicator light 36. However, the contacts and indicator lights have been given similar identifying numerals as they all operate similarly and in parallel. The light bulbs 36 are connected by a conductor 50 to the other terminal of the current supply source 37.

The ball return incline 26 is supported between the sides 51 and 52 of the alley frame and is inclined an amount just sufficient to permit the balls to travel downwardly toward the player's end of the alley. A pair of converging guides 53 are mounted upon the incline 26 to guide the balls into position to be raised by the ball elevating mechanism 23. The converging ends of the guides 53 are sufficiently close together so that only one ball may enter the ball elevating mechanism at a time.

As indicated in Figures 2 and 4 of the drawings the ball elevating mechanism 23 includes the vertical plunger 54 which is journaled in a suitable bearing 55 on the alley end 22. A ball supporting shelf 56 is supported by the plunger 54 near the lower end thereof. A spring 57 encircles the plunger 55 above the bearing 52 and tends to urge the plunger upwardly. The spring 57 is preferably of sufficient strength to raise the plunger when a ball 24 is resting upon the shelf 56.

A flexible belt 59 is secured to the shelf 56 near the forward end thereof. This belt 59 passes over a roller 60 and is held taut by a spring 61 or other suitable resilient means. This belt 59 prevents the balls 24 from rolling under the shelf 56 when the shelf is in elevated position.

In order to elevate the ball 24 the plunger 54 is pressed downwardly compressing the spring 57 until the shelf 56 is below the level of the roller 60. At this time the ball 24 will roll onto the shelf 56 and seat in the pocket 62 or slight depression in the upper surface of the shelf. Downward pressure upon the plunger 54 is then released and the spring 57 raises the ball 24 until it is above the level of the playing surface 10 or flush therewith, at which time it may be rolled onto the playing surface.

The control post 21 acts as a support for the push buttons 42 through 46 so that each individual target may be lowered when a corresponding push button is actuated. This arrangement is provided so that the score may be readily checked. Each target is given a certain value and the pivoting of each target adds to the score of the corresponding player.

The ball is propelled by the device illustrated in Figures 6 and 7 of the drawings. The ball propelling device is indicated in general by the numeral 63 and includes an elongated shaft 64 usually having a handle grip 65 which is at one end thereof. A disc like body 66 is supported at the other end of the shaft 64 with its axis at substantially right angles to the axis of the shaft 64. The flat surface of the disc 66 is placed against the ball and the ball is propelled toward the targets somewhat in the manner in which a hockey puck may be propelled by a hockey stick.

The rules of the game may vary considerably and various games may be played with the same apparatus. For example the players may count a bank shot deflected from one of the side rails 11 or 12 or may prefer to not give a score for such a shot. One player may roll a series of balls in succession and the targets pivoted may be retained in tilted position until he is through with the series of balls if desired. In such an event the player is penalized by propelling two balls toward the same target. If preferred the players may return the targets to vertical position after each ball has been propelled. The particular manner in which the game is played and the specific rules employed are a matter of choice rather than a part of the present invention.

If the alley or playing surface 10 is flush with the floor, or substantially so, the players may stand upon the floor beside the alley while propelling the balls. However, if the apparatus rests upon the floor, a platform 67 may be provided alongside of the alley 10 on which the players may walk during the playing operation.

In accordance with the patent statutes, I have described the principles of construction and operation of my game, and while I have endeavored to set forth the best embodiment thereof, I desire to have it understood that obvious changes may be made within the scope of the following claims without departing from the spirit of my invention.

I claim:

1. In a game device of the class described, an elongated alley, a plurality of target members, means pivotally supporting the upper ends of said members above one end of the alley, a latch element carried at the lower end of each target member, a pivotally mounted lever in the path of each latch element, each said lever having a dog end for engaging a particular latch element and a heavier armature end biasing said dog end upwardly to maintain engagement of each dog end with each latch element when said target members are swung in a direction to effect said engagement, and individual electromagnetic means positioned in operative relation above each armature and for attracting each armature end to thereby effect release of the dog end opposite that armature end, whereby any target member may be permitted to return to normal position upon energization of the electromagnetic means associated therewith.

2. In a game device of the class described, an elongated alley, a plurality of substantially flat target members, means pivotally supporting the upper ends of said members above one end of the alley, a pit adjacent said one end of the alley for receiving balls rolled along said alley, said target members being susceptible of sufficient pivotal movement to permit the rolling balls to enter said pit and said flat target members deflecting said balls downwardly into the pit, and releasable latch means for latching said target members in the respective pivoted positions to which they are moved when struck by the rolling balls.

VICTOR NIEWINSKI.

REFERENCES CITED

The following references are of record in the file of this patent:

UNITED STATES PATENTS

| Number | Name | Date |
|---|---|---|
| 1,127,861 | Connor | Feb. 9, 1915 |
| 1,543,636 | Williamson | June 23, 1925 |
| 1,574,915 | Marston | Mar. 2, 1926 |
| 1,636,042 | Buckberg | July 19, 1927 |
| 1,694,691 | Rentz | Dec. 11, 1928 |
| 1,941,630 | Smith | Jan. 2, 1934 |
| 1,998,153 | Beland | Apr. 16, 1935 |
| 2,080,231 | Rockola | May 11, 1937 |
| 2,126,572 | Morrill | Aug. 9, 1938 |
| 2,127,282 | Beckett | Aug. 16, 1938 |
| 2,205,217 | Morrill | June 18, 1940 |